March 17, 1959  R. ALTSON  2,878,083
JOURNAL BOX
Filed Nov. 19, 1956
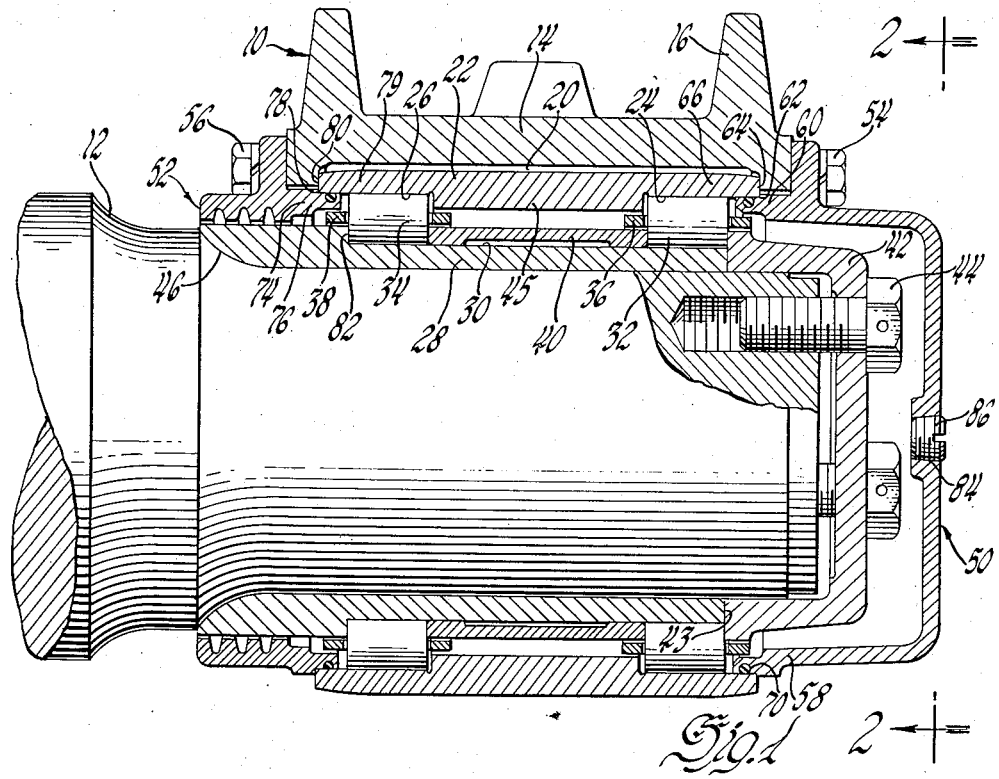
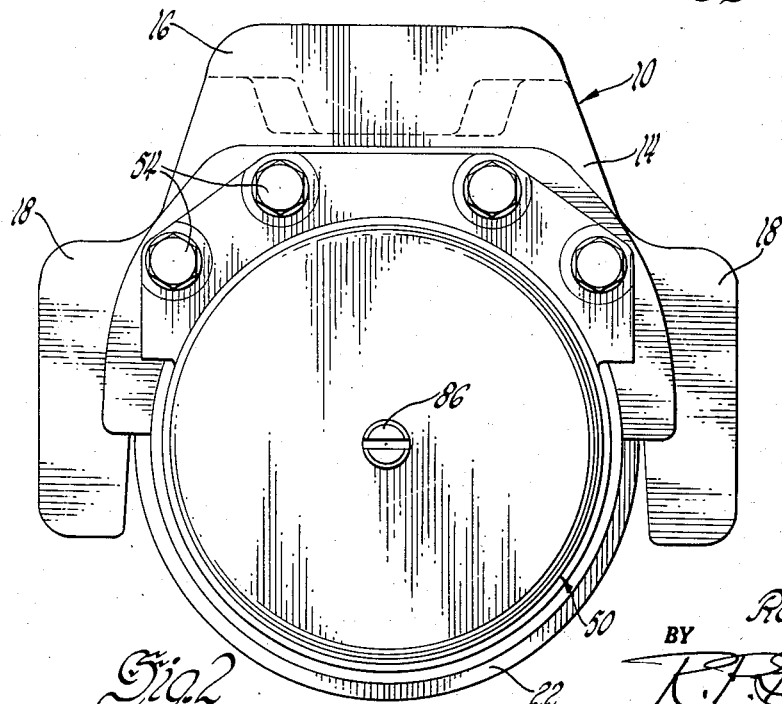
INVENTOR.
Ralph Altson
BY
R. F. Barnard
ATTORNEY.

United States Patent Office 2,878,083
Patented Mar. 17, 1959

2,878,083

JOURNAL BOX

Ralph Altson, Douglaston, N. Y., assignor to General Motors Corporation, Detroit, Mich., a corporation of Delaware Application November 19, 1956, Serial No. 623,070

9 Claims. (Cl. 308—180)

This invention relates to journal boxes and particularly to an improved type of railway journal box having antifriction bearings that receive an axle for free rotation.

The present invention is particularly directed to the development of a lightweight type journal box in which it is possible to considerably reduce the mass of the journal box without reducing its load carrying capacity. Further, the present unique journal box construction provides an outer bearing member separate and distinct from the journal box housing and which member can be rotated to adjust for wear without necessitating the replacement of any parts.

In the present invention the load carrying portion of the journal box housing only partially surrounds the axle and the outer bearing member actually constitutes a part of the over-all journal housing which encloses the antifriction bearings. By utilizing a relatively light weight outer bearing member as an appreciable part of the journal housing, it is thereby possible to eliminate a large part of the considerably more massive journal housing which has heretofore been used extensively by the railroad industry.

In the drawing:

Figure 1 is a sectional view showing the journal box construction; and

Figure 2 is an end view of the journal box along line 2—2 of Figure 1.

Referring to the drawing, the journal box is shown generally at 10 and is adapted to rotatably receive an axle 12. Journal box 10 includes a U-shaped or half moon type casting or housing 14 which is adapted to partially surround the axle 12 in such a way that the open end of the housing faces downwardly. The housing 14 includes a seat 16 formed on the upper side thereof and which seat is adapted to support one end of a spring, the other end of which supports a truck pedestal and neither of which latter elements is shown. Each side or leg of the housing 14 has a pair of spaced laterally extending guide flanges 18. These guide flanges and the housing side walls cooperatively provide vertically disposed open ended grooves at each side of the housing arranged to slidably receive laterally spaced downwardly extending legs of a truck pedestal. Flanges 18 are shown in the present modification terminating below the longitudinal axis of axle 12.

Housing 14 is radially relieved along its inner periphery to provide a transversely extending portion 20 which is adapted to receive an outer bearing member 22. Before briefly describing the bearing arrangement insofar as it is pertinent to the subject invention, it is to be noted that the bearing arrangement is shown and described in copending application Serial Number 576,153, Cramer, filed April 4, 1956 and does not, per se, constitute a part of the present invention except insofar as claimed in combination with other elements of the present device. The outer bearing member 22 includes axially spaced radially relieved portions 24 and 26 which provide bearing races.

A sleeve 28 is mounted upon axle 12 and radially relieved to provide an inner bearing race 30. Two sets of roller bearing elements 32 and 34 are respectively disposed between inner race 30 and outer bearing races 24 and 26. The roller bearing elements are circumferentially spaced by separators or cages 36 and 38. The sets of rollers 32 and 34 are axially spaced by a sleeve 40 disposed therebetween and concentrically mounted and journaled on the sleeve 28. An end cap 42 is secured to the axle 12 through studs 44 and maintains the sleeve 28 against a flanged shoulder 46 formed on axle 12 and insures that the sleeve will be retained against rotary movement relative to the axle. The inner face 43 of end cap 42 also abuts the roller elements 32 and thus maintains the bearing assembly in a generally axially fixed relationship relative to the axle 12.

Portion 45 of outer bearing member 22 formed between raceways 24 and 26 is axially shorter than sleeve 40 thus permitting axial movement of the axle relative to the journal box in a manner causing the axial thrust to be alternatively transmitted through the roller sets 32—34 to the journal housing 14. The flat end or radial faces of elements 32 and 34 and the cooperating faces of the outer and inner bearing sleeves 22 and 28 as well as separator sleeve 40 maintain the elements in parallel axial relation to each other preventing undue wear as described in the aforenoted Cramer application.

Front and rear end caps 50 and 52 enclose the inner and outer bearing members 22 and 28 to seal the bearings against dirt and also to provide a housing in which suitable lubricant, such as grease, may be retained. Studs 54 and 56 respectively secure the front and rear end caps to the journal box housing 14.

The front end cap 50 includes a cylindrical portion 58 which extends axially inwardly of the journal housing 14 and terminates in a radially relieved portion 60 extending within and radially supported by the outer end 66 of the outer bearing member 22. Radially relieving portion 60 provides a shoulder 62 which is adapted to abut against the radially outer face 64 of the bearing member 22. The radial relieved portion 60 of end cap 50 terminates axially short of the inner face 43 of cap 42 so that no axle end thrust is transmitted thereto during the axial shifting of axle 12.

The outer periphery of portion 60 has an annular groove formed therein for supporting an O-ring 70 which is adapted to prevent the leakage of lubricant between the adjacent faces of end cap portion 60 and end portion 66 of the outer bearing member 22.

The rear end cap 52 has a similar inwardly extending cylindrical portion 74 which is radially relieved to provide a portion 76 to support the inner end 79 of the outer bearing member 22 and to provide a shoulder 78 which abuts the radial end face 80 of member 22. Rear end cap portion 74 also terminates axially short of the axial thrust carrying shoulder 82 formed on sleeve 28.

Thus, the end cap 50 and 52 are radially supported by the outer bearing member 22 upon the journal housing 14. Further, shoulders 62 and 78 of end caps 50 and 52 coact respectively with the radial faces 64 and 80 of bearing member 22 in a manner to clamp the latter against rotary movement.

The unique manner in which the present journal box has been constructed to provide an outer bearing member 22 independent of the journal housing 14 and further providing means by which the outer bearing member 22 is clamped against rotation makes it possible to untighten the stud members 54 and 56, jack up the vehicle truck and rotate the outer bearing member 22 relative to the housing 14 to adjust for uneven wear of the member. In this way the life of the bearing is greatly increased and maintenance costs thereby reduced.

An opening 84 is provided in front end cap 50 through which bearing lubricant is adapted to be introduced within the journal box. A cap screw 86 is adapted to close the opening 84.

It is apparent that various structural modifications may be made in the present lightweight journal box within the intended scope of the present invention.

I claim:

1. A journal box for receiving a rotatable axle, said journal box comprising a U-shaped housing member partially surrounding said axle and having a radially relieved portion, a cylindrical bearing member concentrically disposed about said axle and having a major portion of its length disposed within said radially relieved portion, antifriction bearing elements disposed between said axle and said bearing member, end caps removably secured to said U-shaped housing member whereby the bearing element supporting portion of said axle is enclosed by said housing member, said bearing member and said end caps, and said end caps including means for supporting said bearing member against rotation upon the U-shaped housing member.

2. A journal box for supporting a load upon a rotatable axle, said journal box comprising a housing extending partially around the axle, a cylindrical outer bearing member concentrically mounted about said axle and disposed within a radially relieved portion of said housing, an inner cylindrical bearing member fixed for rotation upon said axle, bearing elements disposed between said inner and outer bearing members to rotatably support the axle within the journal box, front and rear end caps for enclosing the inner and outer bearing members, means for removably securing said end caps to said housing member, and means formed on said end caps for supporting said outer bearing member within the relieved portion of said housing, said end cap means coacting to hold said outer bearing member against rotary movement.

3. A journal box for rotatably supporting an axle, said journal box comprising a U-shaped housing member extending around the axle so that the open end extends downwardly, a load supporting seat formed on the upper end of said housing member, the downwardly extending legs of said U-shaped housing terminating below the longitudinal axis of said axle, a cylindrical outer bearing member concentrically mounted about said axle and disposed within a radially relieved portion of said housing, an inner bearing member fixed for rotation upon said axle, roller bearing elements disposed between said inner and outer bearing members to rotatably support the axle within the journal box in such a way that the axial thrust of said axle is transmitted to said U-shaped housing, front and rear end caps for enclosing the inner and outer bearing members, means for removably securing said end caps to said housing member, said end caps including cylindrical portions extending axially within said housing member and adapted to radially support said outer bearing member, said axially extending cylindrical portions of said end caps being adapted to clamp said outer bearing member therebetween to hold the latter against rotary movement.

4. A journal box for rotatably supporting an axle, said journal box comprising a U-shaped housing member extending around the axle so that the open end extends downwardly, a load supporting seat formed on the upper end of said housing member, the downwardly extending legs of said U-shaped housing terminating below the longitudinal axis of said axle, a cylindrical outer bearing member concentrically mounted about said axle and disposed within a radially relieved portion of said housing, an inner bearing member fixed for rotation upon said axle, roller bearing elements disposed between said inner and outer bearing members to rotatably support the axle within the journal box in such a way that the axial thrust of said axle is transmitted to said U-shaped housing, means for removably maintaining said inner bearing members and bearing elements upon said axle, front and rear end caps for enclosing the inner and outer bearing members, means for removably securing said end caps to said housing member, and said end caps including cylindrical portions extending axially within said housing member and adapted to radially support said outer bearing member, said axially extending cylindrical portions of said end caps being adapted to clamp said outer bearing member therebetween to hold the latter against rotary movement.

5. A journal box for rotatably supporting an axle, said journal box comprising a U-shaped housing member extending around the axle so that the open end extends downwardly, a load supporting seat formed on the upper end of said housing member, the downwardly extending legs of said U-shaped housing terminating below the longitudinal axis of said axle, a cylindrical outer bearing member concentrically mounted about said axis and disposed within a radially relieved portion of said housing, an inner bearing member fixed for rotation upon said axle, roller bearing elements disposed between said inner and outer bearing members to rotatably support the axle within the journal box in such a way that the axial thrust of said axle is transmitted to said U-shaped housing, front and rear end caps for enclosing the inner and outer bearing members, means for removably securing said end caps to said housing member, said end caps including cylindrical portions extending axially within said housing member and adapted to radially support said outer bearing member, said axially extending cylindrical portions of said end caps being adapted to clamp said outer bearing member therebetween to hold the latter against rotary movement, and sealing means disposed between the axially extending cylindrical portion of said end caps and the cooperating portions of said outer bearing member.

6. A journal box for supporting a load on a rotatable axle, said journal box comprising a housing extending partially around the axle, a cylindrical outer bearing member concentrically mounted about said axle and disposed within a radially relieved portion of said housing, a raceway formed in said member, a circumferentially disposed set of rollers engaging the raceway and receiving the axle for anti-frictional rotation, a sleeve member mounted about the axle, said sleeve having an annular shoulder engageable with the rollers and positioning the rollers axially parallel to the axis of said axle, front and rear end caps for enclosing said rollers, means for removably securing said end caps to said housing, and means formed on said end caps for supporting said outer bearing member within the relieved portion of said housing, said end cap means coacting to hold said outer bearing member against rotary movement.

7. A journal box for supporting a load on a rotatable axle, said journal box comprising a housing extending partially around the axle, a cylindrical outer bearing member concentrically mounted about said axle and disposed within a radially relieved portion of said housing, a raceway formed in said member, a circumferentially disposed set of rollers engaging the raceway and receiving the axle for anti-frictional rotation, a race ring fitted under the axle and having a raceway rotatably received by the rollers, said rollers having flat end faces radially disposed to their axes, the race ring having an annular shoulder radially disposed to the axle axis, a roller guiding sleeve slidable on and journaled on the race ring and having an annular shoulder radially disposed to the axle axis, said annular shoulders being cooperatively engageable with the flat end roller faces to guide the rollers axially parallel to the axis of said axle, front and rear end caps for enclosing said rollers, means for removably securing said end caps to said housing, and means formed on said end caps for supporting said outer bearing member within the relieved portion of said housing, said end cap means coacting to hold said outer bearing member against rotary movement.

8. A journal box for rotatably supporting an axle, said journal box comprising a U-shaped housing member extending around the axle so that the open end of said member extends downwardly, a load supporting seat formed on the upper end of said housing member, the downwardly extending legs of said U-shaped housing terminating below the longitudinal axis of said axle, a cylindrical outer bearing member concentrically mounted about said axle and disposed within a radially relieved portion of said housing, a raceway formed in said member, a race ring secured under the axle and having a cylindrical raceway and provided with an annular shoulder radially disposed to the axle axis, a circumferentially disposed set of cylindrical rollers engaging both raceways for anti-frictional rotation of the axle, the rollers having radially disposed flat end faces, said axle being shiftable endwise in the housing and limited in its endwise movement in one direction by the roller engagement with said shoulders, a roller guiding sleeve slidably and rotatably journaled on the respective ring, said sleeve having a flat end roller-engaging face which guides the rollers in axially parallel relation to the race ring axis to provide a free rolling movement of said rollers, front and rear end caps for enclosing said rollers, means for removably securing said end caps to said housing member, said end caps including cylindrical portions extending axially within said housing member and adapted to radially support said outer bearing member, said axially extending cylindrical portions of said end caps being adapted to clamp said outer bearing member therebetween to hold the latter against rotary movement.

9. A journal box for supporting a load on a rotatable axle, said journal box comprising a housing extending partially around the axle, a cylindrical outer bearing member concentrically mounted about said axle and disposed within a radially relieved portion of said housing, said member having cylindrical raceways and a pair of spaced annular shoulders respectively located at the inner ends of said raceways, a pair of axially spaced circumferentially disposed sets of cylindrical rollers respectively engageable with the raceway and with said shoulders and receiving the axle for anti-frictional rotation, the inner ends of each set of rollers having radially disposed flat faces, a roller guiding sleeve journaled about the axis between said sets of rollers and having a length exceeding a distance between the housing shoulders, the roller guiding sleeve having radially disposed annular shoulders engageable with the flat roller ends to locate the rollers in parallel axial relation to each other, shoulder means on the axle respectively engageable with the outer ends of each set of rollers, front and rear end caps for enclosing the roller sets, stud members for removably securing said end caps to said housing member and said end caps including cylindrical portions extending axially within said housing member and axially spaced from said rollers, said portions being adapted to radially support said outer bearing member and to clamp said outer member therebetween to hold the latter against rotary movement.

References Cited in the file of this patent

FOREIGN PATENTS 715,982    Great Britain ---------- Sept. 22, 1954